United States Patent

[11] 3,586,396

| [72] | Inventors | Victor L. Barr<br>Jenkintown;<br>Siegfried Beimfohr, Morrisville, both of, Pa. |
|---|---|---|
| [21] | Appl. No. | 844,798 |
| [22] | Filed | July 25, 1969 |
| [45] | Patented | June 22, 1971 |
| [73] | Assignee | Roller Bearing Company of America<br>West Trenton, N.J. |

[54] ANTIFRICTION CARRIAGE ROLLER
2 Claims, 9 Drawing Figs.

| [52] | U.S. Cl. | 308/6R |
|---|---|---|
| [51] | Int. Cl. | F16c 29/06 |
| [50] | Field of Search | 308/6, 187, 213, 72 |

[56] References Cited
UNITED STATES PATENTS

| 1,338,939 | 4/1920 | Laycock | 308/213 |
|---|---|---|---|
| 1,356,444 | 10/1920 | Golden | 308/187 |
| 1,742,840 | 1/1930 | Wing | 308/196 |
| 2,280,659 | 4/1942 | Muller | 308/187 |
| 2,977,161 | 3/1961 | Cobb | 308/187 |
| 3,243,212 | 3/1966 | May | 308/72 |

*Primary Examiner*—Martin P. Schwadron
*Assistant Examiner*—Frank Susko
*Attorney*—Jackson, Jackson & Chovanes ABSTRACT: A carriage or mast roller for use on a fork lift truck or the like which is assembled by fracturing an inner race along its length, and after insertion of antifriction rolling elements, such as balls or rollers in cooperation with the outer race, joining together the fracture components in axially abutting interlocking relation. In the case of a ball bearing, the inner race can be machined so that the cross section forms parts of two different circles, and so that the balls engage the inner race on two axially spaced circumferential contacts. On either ball or roller bearings, can provide a lubrication opening or openings at the midlength of the inner race.

INVENTORS.
VICTOR L. BARR
SIEGFRIED BEIMFOHR
BY
ATTORNEYS.

INVENTORS
VICTOR L. BARR
SIEGFRIED BEIMFOHR
BY
ATTORNEYS

INVENTORS
VICTOR L. BARR
SIEGFRIED BEIMFOHR

ATTORNEYS.

ANTIFRICTION CARRIAGE ROLLER

DISCLOSURE OF INVENTION

The present invention relates to antifriction carriage or mast rollers of the type which may be used on a fork lift truck, and provided either with ball bearings or roller bearings, as desired.

Antifriction carriage rollers of the type shown in Victor L. Barr U.S. Pat. No. 2,643,162 granted June 23, 1963, for Antifriction Carriage Roller, have presented problems in visibility of the operator. In general in the prior art the smaller size and the less heavily loaded antifriction carriage rollers have ball bearing, while the larger and more heavily loaded ones are provided with roller bearings. By far the greater number of installations use ball bearings.

In manufacturing ball bearings for this purpose, Conrad-type bearings have frequently been used. In these bearings, the inner race is crowded over to one side with respect to the outer race, all the balls are inserted in this somewhat eccentric space between the races, the outer race is then formed into an oval shape, and the balls are then circulated around the races. Since the inner race has a single midlength contact with the balls, it is not practical to provide any lubrication opening through the inner race, and carriage rollers of this type are usually grease packed at manufacture for the life of the bearing. Unfortunately, this has led to a very severe problem of corrosion, especially where the fork lift truck moves into and out of a cold room or freezer. The bearings are said to "breath" depositing moisture inside by pumping in moisture-laden air, and later removing dry air and this moisture has led to very severe corrosion and bearing failure.

One of the primary objectives of the present invention, therefore, is to reduce the difficulty from corrosion in antifriction carriage rollers of the ball bearing type by permitting lubrication openings to be introduced through the inner race, suitably connected with a lubricating passage in a stub shaft or the like on which the carriage roller may be mounted. The flushing of lubricant through the bearing permits expulsion of moisture and guards against accelerated corrosion.

As Conrad-type ball bearings have become more heavily loaded, further difficulty has been encountered, since it it not possible to insert a complete complement of balls engaging one another endlessly around the race in a Conrad bearing and instead the balls are widely spaced. In bearings of this type, therefore, if a heavy load is applied, there may be difficulty because the load at times will fall at points intermediate between the balls, causing a bridging or bending stress which may damage one of the races or the balls.

One of the limitations on design and construction of antifriction carriage rollers using Conrad-type ball bearings is that it is necessary to flex the outer race to an oval condition in order to insert the balls in a Conrad-type ball bearing, and, therefore, it is not practical to combine the tire or tread with the outer race, since the tire must be a massive rigid member. One of the advantages, therefore, in departing from the Conrad-type of ball bearings as provided in the present invention is that the tire and outer race can be combined in one piece where it is desirable to do so, although they need not be made is this fashion.

One central concept in the present invention is that the inner race should initially be made as one piece, with inner and outer cooperating circumferential notches, and then fractured by load so that it separates into two fracture components along a typically irregular fracture surface. In order to assemble the rolling elements, whether they be rollers or balls, advantage can be taken of axial separation of the fracture components, so that the rolling elements can be literally fitted into the outer race from the inside and then engaged by the inner race.

In the prior art in some cases the inner race has been made of two separate machined components, but this is much less desirable than making the inner race from fracture components, because the critical problem of tolerance at the axially abutting meeting line between the fracture components does not exist as it did in separately machined race parts. It is very easy by feel to circumferentially adjust the fracture components until the irregularities precisely interfit, then clamp the parts together for welding or other joining, and be definitely assured that the distance from side to side of the race is quite precisely that which was produced before fracturing. This is so because the parts are of hardened steel which does not undergo substantial necking down in fracture, and stress concentration is provided by the notches to maintain a sharp fracture.

One great advantage of the present invention, which does not exist in the Conrad-type ball bearing, although it has been obtained in other prior art ball bearings, is that the curvature in cross section of the two sides of the race, that is those on the different fracture components, will not necessarily conform to the same circle, each race component desirably being machined in cross section on a center which is slightly displaced axially from the center on which the cross section of the opposite race is machined. The curvatures of the two arcs of circles are slightly flatter than the curvature which would be used if machining cross section of the race from a single center, so that the balls will each engage both sides of the race along axially displaced circumferential contacts. This has the considerable advantage in the present invention of reducing the stress which would be applied on an individual ball if only one contact existed at the center Furthermore, these axially spaced contacts provide a thrust capacity which is desirable.

In the present invention there is no restriction of the number of balls or rollers which can be introduced in the bearing except for the limits of the circumference of the race, and the balls or rollers can actually be in contact side to side if desired, or they can be separated by a cage.

It will be evident that in some cases it may be desirable to place the roller carriage at a slight angle to the symmetrical axis of the roller so that a thrust component can be obtained by this means.

In the drawings we have chosen to illustrate only a few of the possible embodiments of the invention, choosing the forms shown from the standpoints of convenience in illustration, satisfactory operation and clear demonstration of the principles involved.

Figure 1:
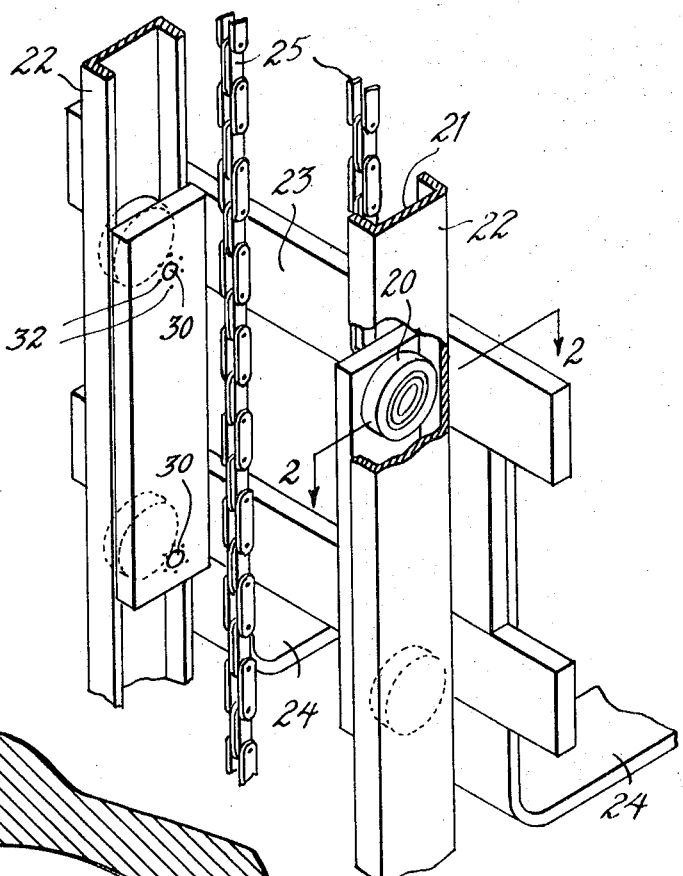
FIG. 1 is a fragmentary perspective of a fork lift truck to which the carriage rollers of the invention have been applied.

Considering now the drawings in detail, the carriage roller of the invention comprises a tire 20 which rolls on track surfaces 21 of channel bars 22. The channel bars comprise masts on a fork lift truck which suitably guide a carriage 23 which supports forks 24 and which is propelled upwardly or downwardly, for example by chains 25 secured to the carriage by means not shown. It is not important in the present invention whether a single stage or multiple stage lift truck is used.

The carriage roller has cooperating with the outer race an inner race 26 which will be described more in detail, the outer and inner races guiding and retaining rolling elements which in some forms will be balls 27 and in other cases rollers 28, in each case engaged by suitable races.

The inner race 26 is mounted on a stud, or stub shaft 30 which may be secured to the fork lift carriage as by seating a boss 31 in an opening and anchoring by screws 32, the outer end of the stub shaft 30, sometimes retaining the inner race as by a spring locking ring 33 seating in an annular slot 34, or by welding. The boss 31 may be welded to the carriage 23 as at 32' in FIG. 3.

Through the center of the stub shaft 30 extends a lubricating opening 35, which may conveniently be contacted by a lubricating fitting 36. The lubricating opening 35 communicates with the inner race by a radial passage 37 with an interior annular notch or recess 38 in the race of a ball bearing (38' in a roller bearing) which communicates at the midlength of the inner race with radially extending lubrication openings 39. In the case of a ball bearing, these lubrication openings are made possible by the fact that the balls engage the inner race on two axially spaced circumferential contacts 40. With a roller bearing, the lubrication openings may be tolerated because of the wide contact area with the rollers.

It will be understood that ball bearings are preferred rather than roller bearings in many cases because of the desire to make the mast and the mast or carriage rollers as narrow as possible so that the operator can obtain maximum visibility of the work.

Figure 3:
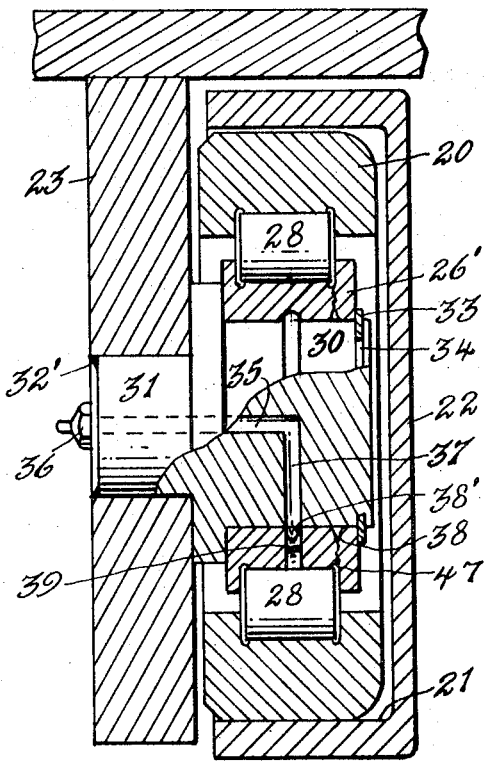
FIG. 3 is a section somewhat similar to FIG. 2, showing a roller bearing according to the invention, rather than a ball bearing as in FIG. 2. Ball bearings are preferred for light loads and roller bearings for heavy loads.

The space in which the antifriction rolling elements turn can be protected against entry of dirt and the like by lubrication seals 41 and 42, as well known, which are snapped in suitable recesses in the races. In FIG. 3 these have been omitted for convenience in illustration.

Figure 5:
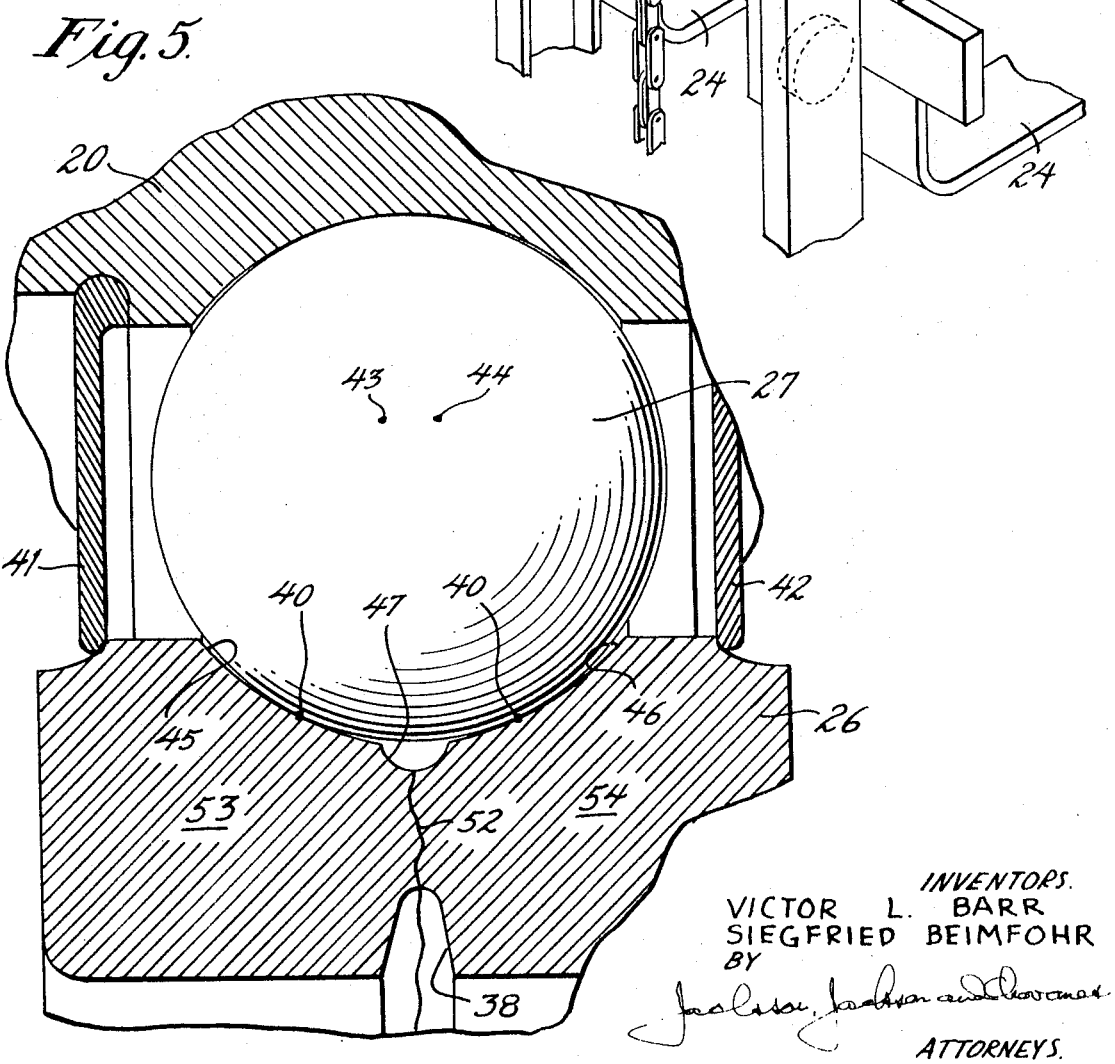
FIG. 5 is a section on the line 5-5 of FIG. 4, greatly enlarged.
Figure 2:
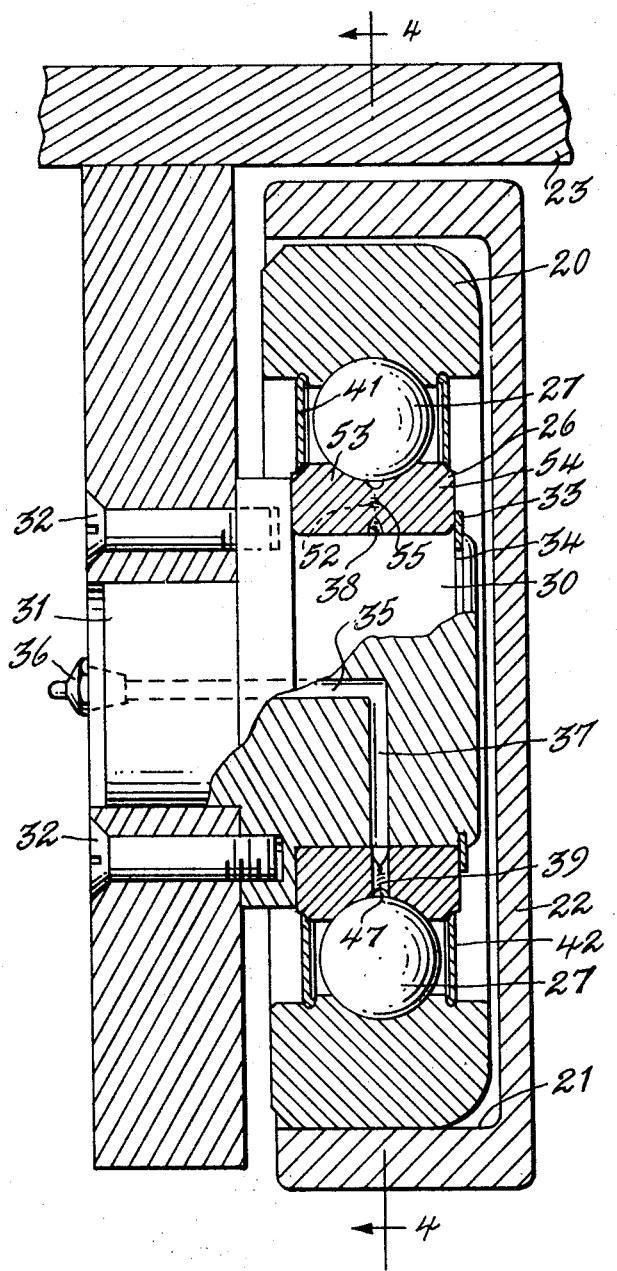
FIG. 2 is an enlarged section of the line 2-2 of FIG. 1.

In order to produce and assemble the bearing as shown in FIG. 5, the inner race, in the case of a ball bearing, is ground or machined on the two sides of the midlength about axially spaced centers 43 and 44 in cross section, so that each side of the race conforms to a different segment of a circle 45 or 46, the curvature of each being slightly flatter than would be the case if the race were ground around a single center in cross section.

Figure 6:
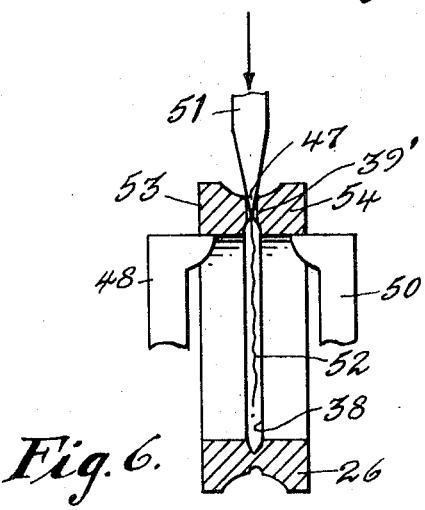
FIG. 6 is an axial section through an inner race showing how it may be fractured.
Figure 4:
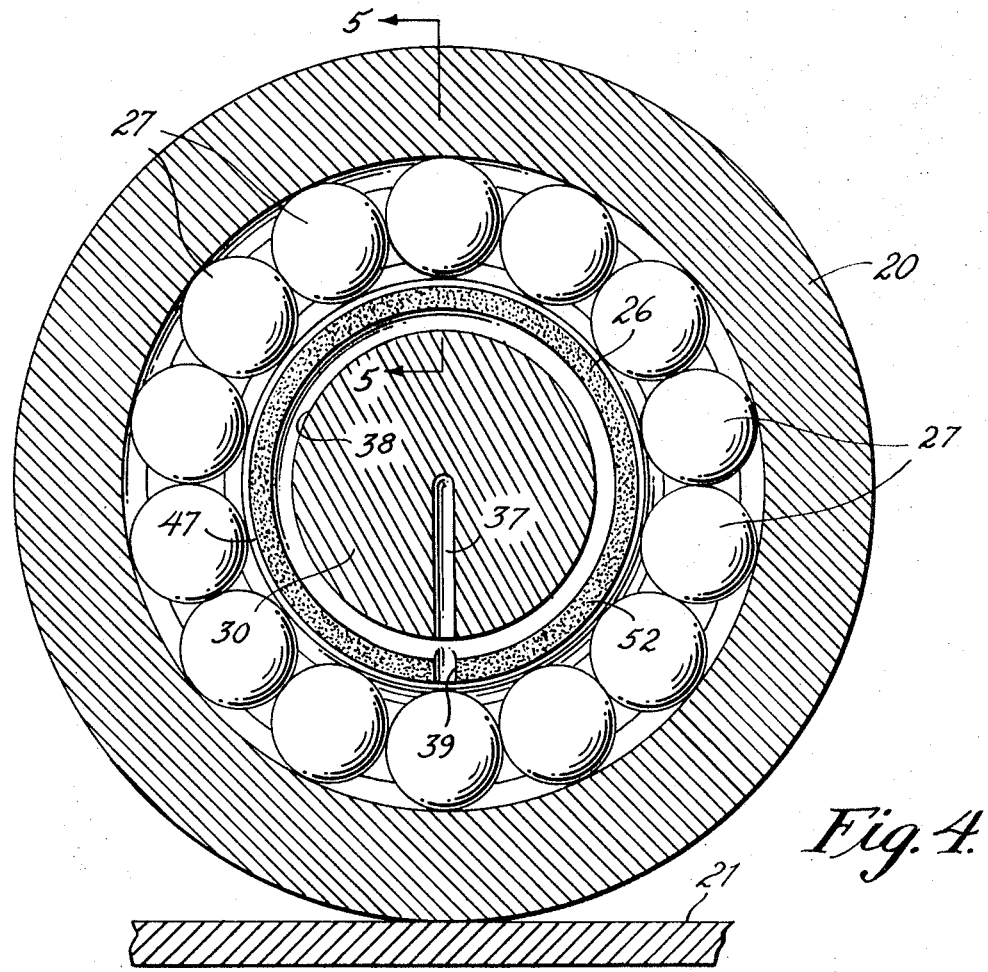
FIG. 4 is a section on the line 4-4 of FIG. 2.

A ball bearing is provided with an inner annular notch 38 at the midlength and an outer annular notch 47 also at the midlength of the inner race 26, the relative depths of the notches being optional, but the inner notch preferably being somewhat deeper, as shown in FIG. 6, so that it is well equipped to serve later as a lubricating channel. The radial lubrication openings through the inner race previously mentioned are then drilled in line with the notches, or they can be inserted prior to insertion of the notches, or ground in after fracture.

In a roller bearing as shown in FIG. 3, the inner and outer notches or recesses 38 and 47 in the inner race 26' are very desirably located opposite the end of the raceway, so that the fracture will take place at that point. It is desirable to combine the groove for fracture with the grinding relief groove at the end of the raceway.

Subsequent to rough machining and suitably subsequent to finish machining if atmosphere control is used, the inner race, suitably consisting of a steel such as AISI 52100, is heat treated to harden it. A carburizing steel such as AISI 8620 or 4615 may be used provided that the carburizing penetrates through the fracture zone. It will be understood that the outer race normally including the tire, and the balls or rollers are also usually made of a similar steel and are hardened by heat treatment.

The fracturing of the inner race generally along the line of the notches is accomplished by any suitable press or roller mechanism which can apply a vigorous fracturing stress. We show in FIG. 6, spaced anvils 48 and 50 which engage the inside of the inner race near both ends, in a ball bearing, and a press plunger 51 for applying force radially inwardly in the groove, causing an annular fracture to form at 52. The press plunger 51 preferably enters a lubrication opening 39'. While the fracture generally follows the line of the annular notches, it will be evident that it has individual small projections and recesses which permit interlocking or interfitting of the opposed fracture components 53 and 54, when it is desired to reassemble them.

The bearing is now assembled by fitting the balls or rollers into the outer race and one fracture component of the inner race, suitably while the races are lying on their sides on a suitable jig or support, and then arranging the cooperating fracture component of the inner race to engage the balls or rollers and to engage the other fracture component, finally rotating the fracture components until they precisely interlock, the exact point of interlocking being determined by feel or with the aid of cooperating marks on the two fracture components. In case rivets or studs are used, the spacing of the holes may be irregular to aid in assembly of the fracture components. It will be evident that the bearing will not normally be preloaded and, therefore, no unusual force is required in assembling.

Figures 7, 8, 9:
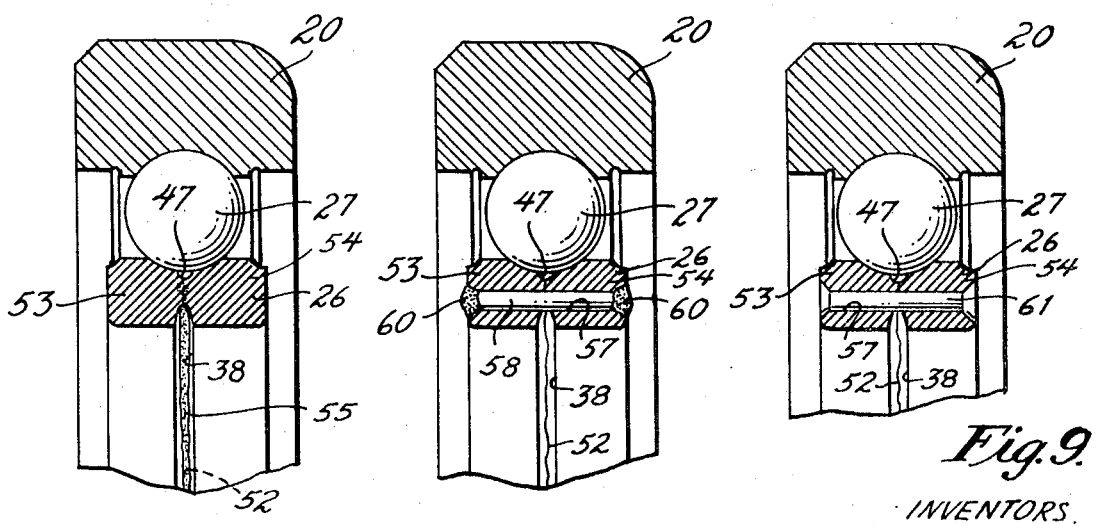
FIG. 7 is a fragmentary axial section through a ball bearing, showing the preferred method of joining the fracture halves.
FIG. 8 is a view similar to FIG. 7, showing joining of the fracture halves by stud welding.
FIG. 9 is a view similar to FIG. 7, showing joining the fracture halves by riveting.

Once the fracture components are correctly arranged, they are conveniently clamped together as by a fixture or assembly clamps, while the two components of the inner race are joined. This can conveniently be accomplished by welding an annular zone along the inside of the fracture components to permanently hold together the two sides of the inner race. A weld zone 55 is shown in FIG. 7, which may be applied by electron beam welding or by electric arc welding extending entirely around the race. It is important not to completely melt the fracture surfaces at their interface, as it is not desired to reduce the axial dimension across the inner race.

In some cases it is preferred to use independent fasteners to hold together the fracture components, and in FIG. 8 we show preferably predrilled openings 57 extending in the direction of the axis across the fracture components and studs 58 in the openings which have been joined together at welds 60 by stud welding or projection welding. It will be evident that this has the advantage that when the studs cool, they are under prestress by virtue of contraction, in a manner similar to the prestress imparted by the annular weld zone 55.

Another form of fastening of the fracture components is by rivets 61 in openings 57 shown in FIG. 9. By riveting hot, prestress is imparted to the fracture components.

In order to guard against the possibility that spatter from annular welding or from stud welding could intrude into the space where the inner race contacts the balls, it is desirable to provide a relatively shallow outer annular notch or groove, as compared to a deeper inner annular notch on the inner race.

In operation, it will be understood that the antifriction mast or carriage roller of the invention can by assembled in the manufacturing plant, omitting the stub shaft or stud, to be supplied at the time of installation, for including the stub shaft, if desired. The mast or carriage roller can then be installed like any antifriction bearing by the manufacturer of the fork lift truck, being careful that adequate lubrication channels are provided and operative lubricating fittings are installed, so that frequent lubrication can prevent accumulation of moisture in contact with the balls or rollers.

It will be evident that when reference is made herein to machining it is intended to include all forms of machining, among others grinding.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention, what we claim as new and desire to secure by Letters Patent is:

1. In an antifriction mast or carriage roller, an outer tire assembly including an integral outer race, an inner race cooperating with the outer race, having a fracture line extending circumferentially around the inner race separating the inner race into fracture component, the fracture components axially abutting in interlocking relation and being held together by an inner circumferential weld, which does not impair the fracture interlock at the outside and antifriction balls operatively engaging the inner and outer races, the inner race being in contact with the balls on two axially spaced circumferential contacts which in cross section are parts of different circles.

2. A mast or carriage roller of claim 1, in which the inner race has a radial lubrication opening near the midlength.